United States Patent [19]

Kapral

[11] 4,055,613

[45] Oct. 25, 1977

[54] PRODUCTION OF THREE-DIMENSIONAL DESIGNS

[75] Inventor: Ales M. Kapral, Menasha, Wis.

[73] Assignee: Akrosil Corporation, Menasha, Wis.

[21] Appl. No.: 517,175

[22] Filed: Oct. 23, 1974

[51] Int. Cl.² .................... B29D 27/04; B29C 1/02; B29C 1/04

[52] U.S. Cl. .................... 264/46.4; 264/53; 264/54; 264/219; 264/225; 264/331; 264/338; 264/DIG. 5; 264/DIG. 60; 428/159; 428/315

[58] Field of Search .............. 264/54, 52, 45.8, 225, 264/46.4, 219, 331, DIG. 5, DIG. 60, 53, 338; 428/159, 315; 156/230

[56] References Cited

U.S. PATENT DOCUMENTS

| | | | |
|---|---|---|---|
| 2,834,052 | 5/1958 | Hunn | 264/219 X |
| 2,920,977 | 1/1960 | Adams | 264/DIG. 60 |
| 2,943,949 | 7/1960 | Petry | 264/45.8 X |
| 2,961,332 | 11/1960 | Nairn | 264/45.8 X |
| 3,293,094 | 12/1966 | Nairn et al. | 264/52 X |
| 3,365,353 | 1/1968 | Witman | 265/54 X |
| 3,428,471 | 2/1969 | Tuthill et al. | 264/52 X |
| 3,525,783 | 8/1970 | Prikkel | 264/225 X |
| 3,641,228 | *2/1972 | Fleck | 264/225 X |
| 3,739,051 | 6/1973 | Smith | 264/219 X |
| 3,789,100 | 1/1974 | Kropscott et al. | 264/219 |
| 3,803,277 | 4/1974 | Bassett | 264/225 X |
| 3,912,569 | 10/1975 | Kapral | 156/230 |
| 3,959,434 | 5/1976 | Squier | 264/45.8 |

OTHER PUBLICATIONS

Whittington, Lloyd R. "Whittington's Dictionary of Plastics," Stamford, Conn., Technomic, c 1968, pp. 59–60, 181 (preface).

"SPI Plastics Engineering Handbook," Third Edition, New York, Reinhold, c 1960, pp. 223–228.

*Primary Examiner*—Philip Anderson
*Attorney, Agent, or Firm*—Mason, Kolehmainen, Rathburn & Wyss

[57] ABSTRACT

Method of producing a three-dimensional pattern on a resin article which comprises producing a two-dimensional pattern on a flexible sheet or web of a heat-foamable plastic material, applying heat to cause said plastic material to expand, thus forming a three-dimensional pattern, applying a release coating to the three dimensional surface of said flexible sheet or web, contacting said three-dimensional surface with a resin plastisol, curing said resin plastisol in contact with said surface to form a solid resin object and removing said flexible sheet or web from said cured resin object to expose the three-dimensional pattern thereon.

13 Claims, 14 Drawing Figures

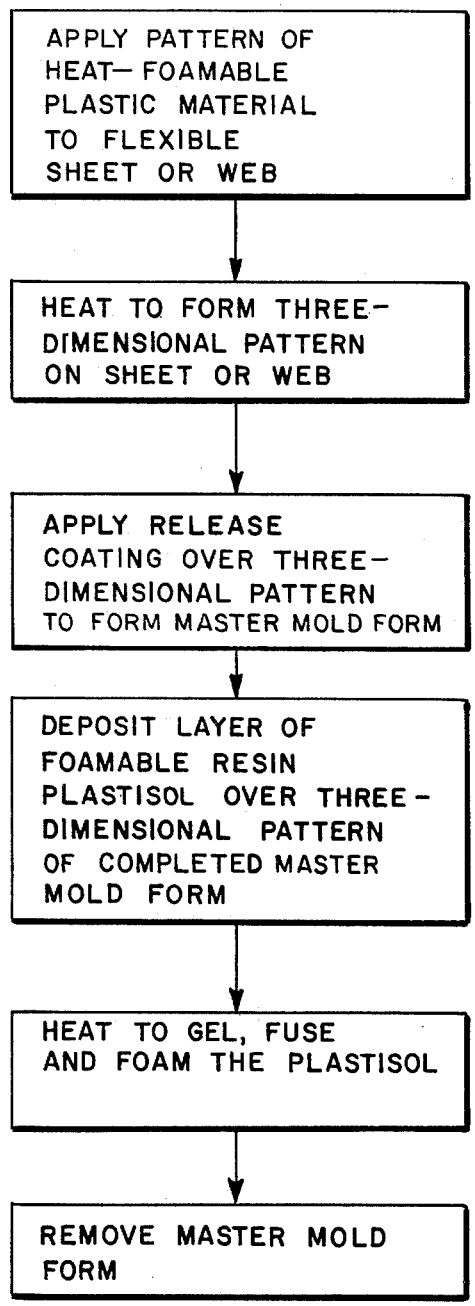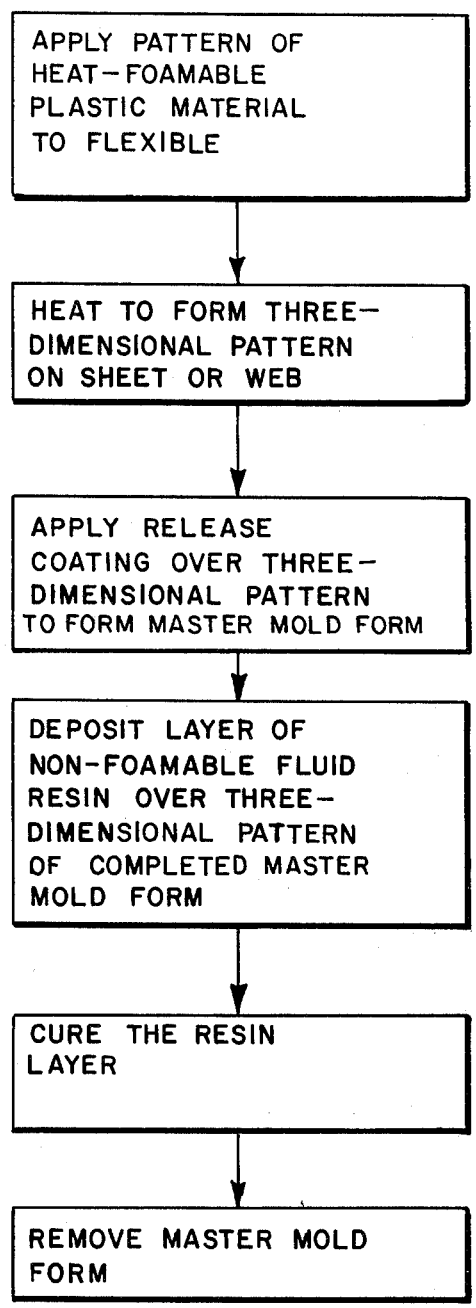
FIG. 1
FIG. 2

PRODUCTION OF THREE-DIMENSIONAL DESIGNS

This invention relates to a method of producing a three-dimensional design or structure on the surface of a three-dimensional plastic or resin object. More particularly, it relates to molding a foamed plastic object with one or more surfaces in contact with a surface bearing three-dimensional design which is coated with a release coating, preferably of a silicone or fluorocarbon resin, and thereafter separating the foamed plastic object from the three-dimensional design-bearing surface.

CROSS-REFERENCE TO RELATED APPLICATIONS

This application discloses an improvement on the invention described and claimed in my copending application Ser. No. 446,271, filed Feb. 27, 1974, now U.S. Pat. No. 3,912,569 the disclosure of which is incorporated herein by reference.

It is an object of this invention to produce sheets or films of thermoplastic resins with three-dimensional patterns or designs thereon.

Another object is the production of resin sheets with three-dimensional patterns thereon by casting sheets from a resin plastisol, or a reactive polyurethane resin mixture, on a master formed of an expanded resin pattern on a substrate wherein the surface is coated with a thin film of silicon releasing agent.

A further object is the production of a resin object with a three-dimensional pattern thereon by causing a resin mass to foam and expand in contact with a silicon-coated three-dimensional pattern and separating the pattern from the resin.

GENERAL DESCRIPTION OF THE INVENTION

In accordance with my invention, a pattern or design is printed on or otherwise applied to a web or sheet of paper, cardboard, plastic film, cloth or similar material, with an expandable or foamable ink or other expandable coating material. After the solvents, if any, are removed by evaporation or other procedure, heat is applied to the ink design, or pattern, causing it to expand in volume by reason of the foaming or blowing agent contained therein, thus producing a three-dimensional design or pattern on the sheet or web. Thereafter, the surface of the sheet or web and the surface of the three-dimensional design or pattern is coated with a release agent such as a silicone or fluorocarbon resin. Then, the three-dimensional surface of the sheet or web is placed in contact with a mass of foamable resin, thermosetting or thermoplastic, rigid or flexible, and the resin is caused to cure and eventually foam or expand, as by application of heat thereto. The expanding resin in contact with the three-dimensional surface conforms to said surface and there is thus produced another three-dimensional surface which is the reverse of that on the sheet or web, that is, it has protrusions where the sheet or web surface has depressions, and vice versa. After the resin has cured and expanded fully and the system has reached equilibrium, the sheet or web is stripped from the foamed resin object, leaving a three-dimensional design or pattern on one or more surfaces thereof.

Alternatively, a layer of fluid non-foaming resin can be applied to the three-dimensional pattern coated with the release agent and cured in place, thus producing a pattern in the cured resin. The resin can be thermosetting or thermoplastic, and rigid or flexible.

DETAILED DESCRIPTION OF THE INVENTION

The foamable ink or coating can be applied from a water emulsion or an organic solvent. Such inks or coatings are available on the market, such as Foamcoat inks, coatings and adhesives sold by Pierce and Stevens Chemical Corp., Buffalo, N.Y. These inks and coatings contain the conventional dyes and/or pigments dispersed in aqueous or organic solvent systems (toluene, xylene, naphtha, etc.), and, in addition, contain expandable resin compositions. The latter include prepolymer and polymer compositions such as polystyrene, polypropylene, polyether-polyurethanes, polyester-polyurethanes, polyvinyl chloride acetate, polyvinyl acetate butyrate, melamine-flormaldehyde and urea-formaldehyde with blowing agents suspended therein. The blowing agents include volatile liquids such as low-boiling hydrocarbons and fluorocarbons and gas-liberating agents such as p,p'-oxybis(benzenesulfonylhydrazide), dinitrosopentamethylenetetramine, azobisformamide, benzenediazonium sulfate, 1,1'-diazoaminonaphthalene, and related organic azides, hydrazides and diazo compounds which release nitrogen on heating. Expandable resin compositions suitable for use in this invention are also disclosed in "Rigid Plastic Foams" by T. H. Ferrigno, second edition, Reinhold Publishing Corporation, 1967.

The inks and coatings described above are applied to the sheet or web by printing or rolling to produce the desired design. After the ink or coating has dried on the sheet or web, it is expanded by heating to 100° to 225° C. The heat causes the blowing or foaming agent to give off gas (e.g., nitrogen, carbon dioxide, hydrocarbon gas, etc.) which causes the layer of ink or coating to expand to 5 to 15 times its original volume, thus producing a three-dimensional pattern on the sheet or web. By controlling the thickness of the layer of ink or coating, and varying the rate of application in certain areas, it is possible to produce patterns in this way which vary in thickness from one area to another by as much as fivefold. Direct transfer coating of the ink to the sheet is preferred, and screen printing and gravure applications are recommended. Other coating methods include curtain coating, knife and knife-over-roll coating, reverse roll, curtain coater and flexo. Heating is accomplished with forced hot air or infrared illumination.

The surface of the web or sheet with three-dimensional pattern thereon is coated with a thin layer of silicone resin in an organic solvent or of fluorocarbon resin in an emulsion or dispersion in water or an organic solvent, and the water or solvent evaporated, thus depositing a thin layer of resin over the surface of the sheet or web and the three-dimensional pattern thereon. The amount of resin applied to the surface of the substrate (sheet or web) with the pattern thereon is 1 to 30 grams per square meter, preferably 2 to 8 g/m$^2$.

The preferred silicone resin is a dialkylpolysiloxane such as dimethylpolysiloxane, although other silicone resins such as diethylpolysiloxane, methylphenylpolysiloxane, diphenylpolysiloxane are suitable. Other suitable silicone resins are described in "Organic Coating Technology" by H. F. Payne, Vol. I, pp. 562-594, John Wiley & Sons, Inc., 1954. The silicone resins at a concentration of 1-15% solids by weight, preferably 3-5%, in an organic solvent are applied to the surface of a substrate and cured by heating, usually with a catalyst like dibutyltin. Emulsions of polytetrafluoroethylene or polytrifluorochloroethylene can likewise be applied to the substrate surface in the quantities given above and the solvents evaporated.

The sheet or web with the three-dimensional pattern thereon, coated with silicone or fluorocarbon resin, is now usable as a master for producing other plastic objects with the reverse pattern on a surface thereof. The simplest procedure is to the master with a resin plastisol composition which is cured on the master and then stripped off. The thickness of the molded resin product so produced can vary from a few millimeters up to several inches or several feet. In practice molded sheets are efficiently made in this manner, and the master re-used many times. The life of the master is governed largely by the silicone release coating thereon. If the latter deteriorates it can be restored by further treatment with a silicone solution.

The most efficient operation is to print the resin pattern on a cylinder rather than a plate, then expand and cure the resin to form a three-dimensional surface on the cylinder. The latter, after being coated with the silicone release composition, can be used to continuously emboss or deboss a continuous sheet or film of organic resin polysol.

The resin plastisol can be any thermoplastic resin, preferably as a cast sheet or film. Preferred materials for the plastisol are vinyl resins (polyvinyl chloride, polyvinyl acetate, polyvinyl chloride acetate, polyvinyl alcohol), polyurethanes (polyester polyurethanes, polyethyl polyurethanes, polyethylene glycol polyurethanes), arylic resins (polymethyl methacrylate, polymethyl acrylate, poly(diethylene glycol methacrylate) poly(pentaerythritol triacrylate), alkyd resins, polyolefin resins, polystyrene resins, polyamide resins (nylon), polyester resins (propylene glycol maleate polymers, diethylene glycol maleate polymers, diethylene glycol fumarate polymers, diethylene glycol terephthalate polymers, triethylene glycol terephthalate polymers). Such thermoplastic resins are well known and are described, for instance, in "Plastics Materials" by J. A. Brydson, D. Van Nostrand Company, 1966.

The resin plastisol can contain foaming agents or not, as desired. If foaming agents are included, they can be any of those described above, in which case the resin sheet or film will expand in contact with the master to produce a cellular sheet or film, usually with open or connecting cells, although closed cells can be produced for special purposes by appropriate foaming agents.

The film of resin plastisol on the master is fused (heated) for a short period of time sufficient to solidify the resin into a flexible sheet with sufficient strength that the sheet can be stripped off the master and that the three-dimensional pattern formed therein retains its shape and dimensions. The heating is usually done by forced hot air or infrared lamps and is carried out at the temperature and time period which is appropriate for the particular resin forming the polysol. Temperatures and times are well known and are available from resin manufacturers. Usually the temperature will be in the range from 40° to 150° C. for periods from a few seconds to a few minutes.

BRIEF DESCRIPTION OF THE DRAWINGS

FIG. 1 is a schematic illustration of the sequence of method steps of the present invention wherein a three-dimensional design is applied to a foamable resin.

FIG. 2 is a schematic illustration of the sequence of method steps of the present invention wherein a three-dimensional design is applied to a non-foamable resin.

DETAILED DESCRIPTION OF THE DRAWINGS

Figure 3A:
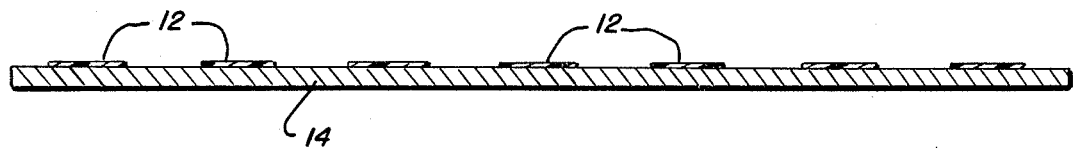
FIGS. 3a–3c are enlarged cross-sectional views of a master mold form in various stages of manufacture; the relative thickness of the various layers are not in proportion.
Figure 3B:
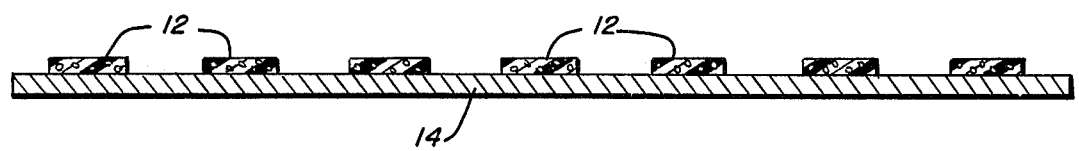
Figure 3C:
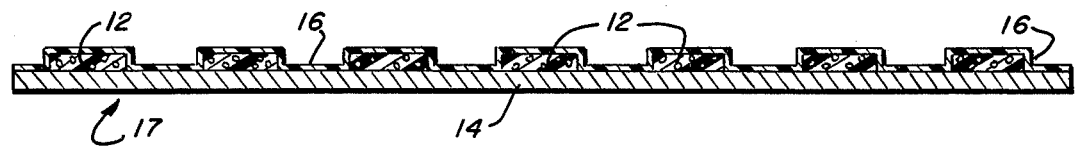
Figure 3D:
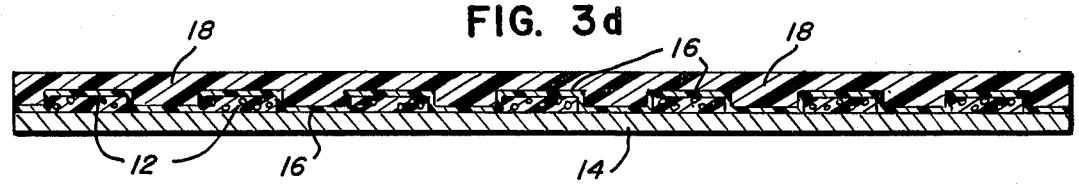
FIGS. 3d–3f are enlarged cross-sectional views of a foamable resin in contact with a master mold form in various stages of production of a foamed resin object; the relative thickness of the various layers are not in proportion.
Figure 3E:
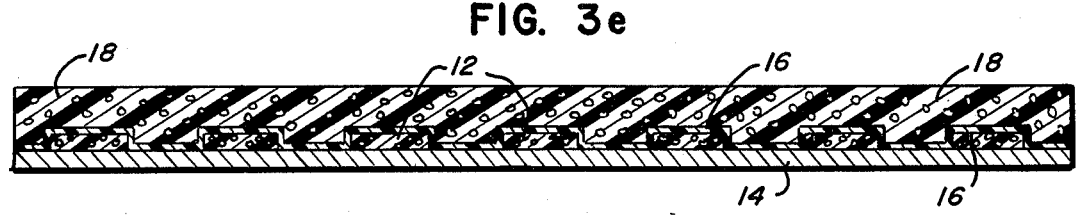
Figure 3F:
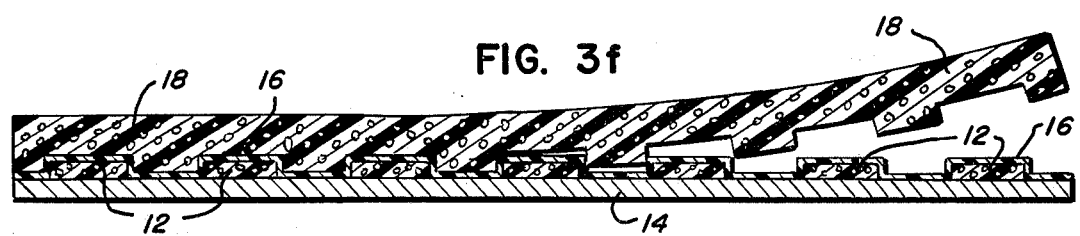

Turning first to FIG. 3a, a foamable ink 12 is applied to a surface of a paper sheet 14 by printing the ink 12 in a desired pattern. After the foamable ink 14 has dried, it is expanded, as shown in FIG. 3b, by heating, thus producing a three-dimensional pattern on the paper sheet 14. The surface of the paper sheet 12, having the three-dimensional pattern thereon, is then coated with a thin layer of a releasing agent 16, such as a silicone resin, as shown in FIG. 3c, to provide a master mold form, indicated generally by reference numeral 17. A foamable fluid resin 18 is then applied over the master mold form 17, as shown in FIG. 3d. The foamable fluid resin 18 is then heated to gel, fuse and foam the resin 18, as shown in FIG. 3e, to form a foamed resin object having a three-dimensional pattern thereon. The master mold form 17 is then stripped from the resin object 18 to provide a surface design in the object 18, corresponding to the three-dimensional pattern on the master mold form 17, as shown in FIG. 3f.

Figure 4A:
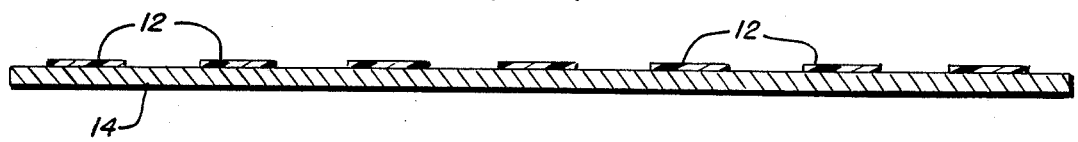
FIGS. 4a–4c are enlarged cross-sectional views of a master mold form in various stages of manufacture; the relative thickness of the various layers are not in proportion.
Figure 4B:
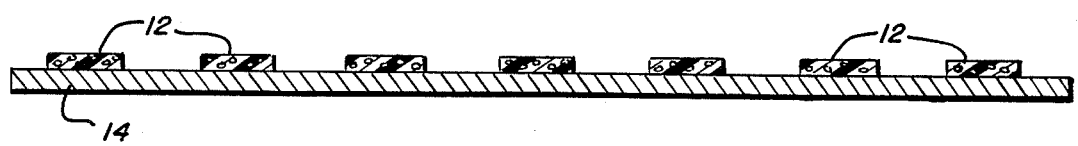
Figure 4C:
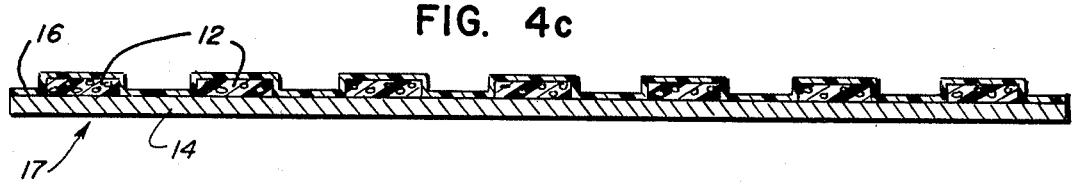
Figure 4D:
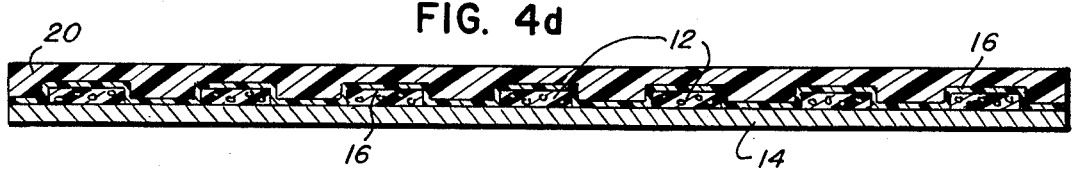
FIGS. 4d and 4e are enlarged cross-sectional views of a non-foamable resin in contact with a master mold form, in various stages of production of a non-foamed resin object; the relative thickness of the various layers are not in proportion.
Figure 4E:
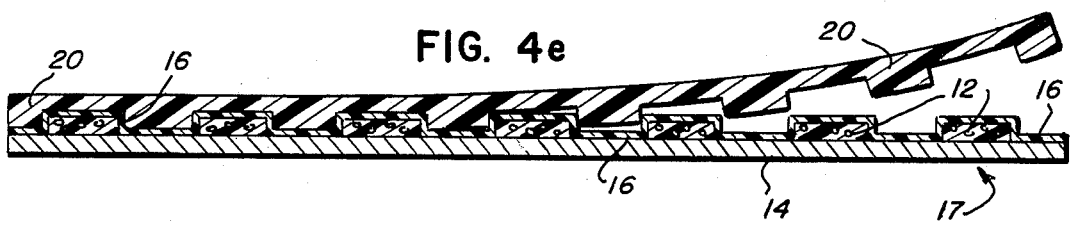

To produce a non-foamed resin object having a three-dimensional design thereon, the steps of applying a heat-foamable resin plastic material 12 and a release coating 16, to provide a master mold form, as shown in FIGS. 4a–4c, are preformed in the same manner as in producing a master mold form for foamed resin objects, as described with reference to FIGS. 3a–3c. When the master mold form 17 is complete, it is coated with a fluid, non-foaming resin 20, as shown in FIG. 4d. The non-foaming fluid resin 20 is then cured, as by heating, to set the three-dimensional pattern in the surface of resin 20. The master mold form 17 is then stripped from the resin object 20 to provide a surface design in the object 20, corresponding to the three-dimensional pattern on the master mold form 17, as shown in FIG. 4e.

Figure 5:
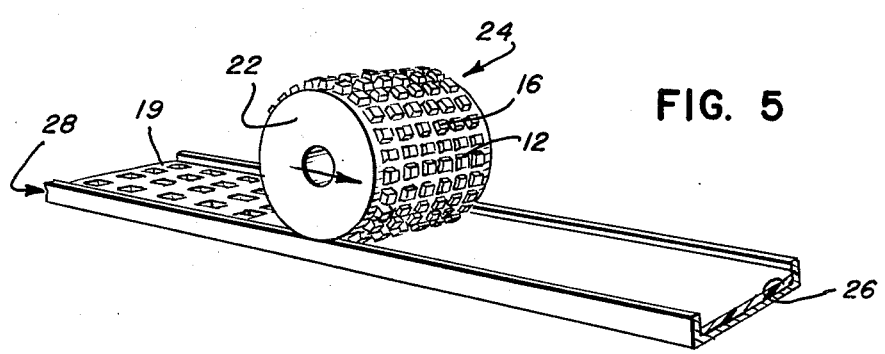
FIG. 5 is a broken-away perspective view showing an embodiment of the method of the present invention wherein a cylinder is used to apply a design continuously to a fluid resin.

In accordance with the embodiment of the present invention shown in FIG. 5, a heat-foamable plastic material 12 is applied in a desired pattern on the surface of a cylinder 22 and after the heat-foamable plastic 12 has been expanded, as by heating, it is coated with a thin layer of a releasing agent, such as a silicone resin 16, to provide a cylindrical master mold form, indicated generally by reference numeral 24. A fluid foaming or non-foaming resin 19 is then disposed in close proximity to cylindrical master mold form 24, as by applying the fluid resin 19 onto a bottom surface 26 of a trough, indicated generally by reference numeral 28. In this manner, the three-dimensional surface of the cylindrical master mold form 24 can contact the fluid resin continuously. The cylindrical master mold form 24 is heated, such as by including an internal heating means therein so that while the three-dimensional pattern is in contact with the resin 19, the resin 19 will be cured, or gelled and fused to apply the three-dimensional pattern to the surface of resin 19. The master mold form 24 is then rotated while contacting the resin 19 to apply a three-dimensional design to a surface of resin 19 in a continuous manner.

I claim:

1. Method of producing a foamed resin sheet having a three-dimensional pattern or design thereon which comprises applying a heat-foamable plastic material in the form of a two-dimensional pattern on a flexible sheet or web, then heating said heat-foamable plastic material to cause said heat-foamable plastic material to unite with said sheet or web and to expand forming a three-dimensional pattern on said sheet or web and thus form a master mold form, applying a release coating to the three-dimensional surface of said flexible sheet or web, depositing a layer of a foamable resin plastisol upon the surface of said three-dimensional pattern, heating said layer to gel, fuse and foam said layer to form a foamed resin object, and removing said master mold form from said foamed resin object to expose the three-dimensional pattern thereon.

2. Method of claim 1 wherein the resin of said foamable resin plastisol is a thermoplastic polyurethane resin.

3. Method of claim 2 wherein the polyurethane resin plastisol contains a foaming agent.

4. Method of claim 3 wherein the foaming agent is a nitrogen-releasing organic compound.

5. Method of claim 4 wherein the release coating is a dialkylpolysiloxane.

6. Method of claim 3 wherein said foaming agent is a chemical blowing agent.

7. Method of producing a resin sheet having a three-dimensional pattern or design thereon which comprises applying a heat-foamable plastic material in the form of a two-dimensional pattern on a flexible sheet or web, then heating said heat-foamable plastic material to cause said heat-foamable plastic material to unite with said sheet or web and to expand forming a three-dimensional pattern on said sheet or web and thus form a master mold form, applying a release coating to the three-dimensional surface of said sheet or web, depositing a layer of fluid non-foaming resin upon the surface of said three-dimensional pattern, curing said layer while said layer is in contact with said three-dimensional surface to form a solid resin article and removing said sheet or web from said fused resin article to expose the three-dimensional pattern thereon.

8. Method of claim 7 wherein said non-foaming resin is thermoplastic.

9. Method of claim 7 wherein said non-foaming resin is thermosetting.

10. Method of continuously producing a resin sheet having a three-dimensional pttern or design thereon which comprises applying a heat-foamable plastic material in the form of a two-dimensional pattern to a cylinder, heating said heat-foamable plastic material to cause said heat-foamable plastic to unite with the cylinder and to expand forming a three-dimensional pattern on said cylinder and thus form a master mold form applying a release material to the three-dimensional surface of said cylinder, continuously contacting a fluid non-foaming resin with said release-coated three-dimensional surface of said cylinder and causing said fluid resin to cure while in contact with said three-dimensional surface to form a solid resin article.

11. Method of claim 10 wherein said heat-foamable plastic material is applied to a flexible sheet or web and said sheet or web is attached to the surface of said cylinder.

12. Method of continuously producing a resin sheet having a three-dimensional pattern or design thereon which comprises applying a heat-foamable plastic material in the form of a two-dimensional pattern to a flexible sheet or web, attaching said sheet or web to a cylinder, heating said heat-foamable plastic material to cause said material to expand forming a three-dimensional pattern on sheet or web and thus form a master mold form, applying a release material to the three-dimensional surface of said sheet or web, continuously contacting a fluid resin with said release-coated three-dimensional surface of said sheet or web by rotating said cylinder, and causing said fluid resin to cure or gel and fuse while in contact with said three-dimensional surface to form a solid resin article.

13. Method of continuously producing a resin sheet having a three-dimensional pattern or design thereon which comprises applying a heat-foamable plastic material in the form of a two-dimensional pattern to a cylinder, heating said heat-foamable plastic material to cause said heat-foamable plastic to unite with the cylinder and to expand forming a three-dimensional pattern on said cylinder and thus form a master mold form, applying a release material to the three-dimensional surface of said cylinder, continuously contacting a fluid foaming resin with said release-coated three-dimensional surface of said cylinder and causing said fluid resin to fuse while in contact with said three-dimensional surface to form a solid resin article.

* * * * *